(12) United States Patent
Dressler et al.

(10) Patent No.: US 8,818,615 B2
(45) Date of Patent: Aug. 26, 2014

(54) METHOD FOR PROCESSING DATA IN AN INFLUENCING DEVICE

(75) Inventors: Marc Dressler, Horn-Bad Meinberg (DE); Bastian Kellers, Paderborn (DE); Daniel Hofmann, Paderborn (DE); Thorsten Hufnagel, Salzkotten (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 13/571,008

(22) Filed: Aug. 9, 2012

(65) Prior Publication Data

US 2013/0041550 A1 Feb. 14, 2013

(30) Foreign Application Priority Data

Aug. 9, 2011 (DE) .......................... 10 2011 052 512

(51) Int. Cl.
*G01M 1/00* (2006.01)
*G01M 17/00* (2006.01)

(52) U.S. Cl.
USPC ........................................ 701/32.8; 701/29.1

(58) Field of Classification Search
CPC ................................ G01M 1/00; G01M 17/00
USPC ................................................ 701/32.8, 29.1
See application file for complete search history.

(56) References Cited

U.S. PATENT DOCUMENTS

| | | | |
|---|---|---|---|
| 2003/0036871 A1* | 2/2003 | Fuller et al. .................... | 702/119 |
| 2008/0052418 A1* | 2/2008 | Marchetti ......................... | 710/7 |
| 2008/0065239 A1 | 3/2008 | Leinfellner et al. | |
| 2008/0082228 A1* | 4/2008 | Massen et al. .................. | 701/29 |
| 2010/0049486 A1 | 2/2010 | Xu et al. | |

FOREIGN PATENT DOCUMENTS

| | | |
|---|---|---|
| DE | 10 2004 027 033 A1 | 10/2005 |
| DE | 10 2006 062 555 A1 | 2/2010 |
| EP | 2 157 488 A2 | 2/2010 |

OTHER PUBLICATIONS

"Überwindung der Beschränken . . . des XCP-Protokolls durch das XCP-Gateway," http://www.automite.de/produkteundleistungen/xcpgateway/sofunktionertdasxcpgateway/index.html.
Hufnagel et al., "To the Protocol, please," Electronics Automotive, pp. 38-41 (Apr. 1, 2009).
Duelks et al., "A real-time test and simulation environment based on standard FPGA hardware," IEEE Testing: Academic and Industrial Conference—Practice and Research Techniques, pp. 197-204 (Sep. 4, 2009).
Bieser et al., "COMPASS—A novel Concept of a Reconfigurable Platform for Automotive System Development and Test," IEEE Workshop on Rapidly System Prototyping, pp. 135-140 (Jun. 8, 2005).

* cited by examiner

*Primary Examiner* — Helal A Algahaim
*Assistant Examiner* — Yazan A Soofi
(74) *Attorney, Agent, or Firm* — Muncy, Geissler, Olds & Lowe, P.C.

(57) ABSTRACT

A method is provided for processing data in an influencing device, whereby the influencing device is connected to a vehicle control unit and to a data processing unit. The vehicle control unit and the influencing device are disposed in a motor vehicle or, for example, on a test bench in a laboratory. A first program runs in the vehicle control unit. Data are exchanged according to an XCP protocol and/or a CCP protocol between the data processing unit and the influencing device. The influencing device has a second execution unit, which executes predetermined data processing steps more rapidly than the first execution unit. The data exchanged by the XCP protocol or the CCP protocol are checked for a predetermined criterion and, based on the result of the check, the data are processed either in the first execution unit or in the second execution unit.

7 Claims, 4 Drawing Sheets

METHOD FOR PROCESSING DATA IN AN INFLUENCING DEVICE

This nonprovisional application claims priority under 35 U.S.C. §119(a) to German Patent Application No. 10 2011 052 512.2, which was filed in Germany on Aug. 9, 2011, and which is herein incorporated by reference.

BACKGROUND OF THE INVENTION

1. Field of the Invention

The invention relates to a method for processing data.

2. Description of the Background Art

DE 102004027033 A1, which corresponds to US 20080065239, and which is incorporated herein by reference, discloses a method for processing data from a motor vehicle control unit 12 and a data processing unit 14 by an influencing device 11.

As shown in FIG. 3 and FIG. 4, a motor vehicle control unit 12 is connected to an influencing device 11, whereby motor vehicle control unit 12 and influencing device 11 are disposed together in a housing 13 or in two different housings. In this regard, motor vehicle control unit 12 and influencing device 11 are disposed in a motor vehicle either as shown in FIG. 4 or in a laboratory or a test bench as shown in FIG. 3. A first program, for example, for controlling an engine, runs in vehicle control unit 12.

As illustrated in FIG. 5, influencing device 11 is connected to a data processing unit 14 via a data processing unit interface 15. A data processing unit 14 is, for example, a personal computer, a simulator, or a processor board. The data exchange between influencing device 11 and data processing unit 14 occurs according to the standardized XCP protocol and/or the CCP protocol.

A task of influencing device 11 is, for example, to read values from vehicle control unit 12 and to send them to data processing unit 14, so that vehicle control unit 12 can be tested by data processing unit 14 in regard to its functions. Another task of influencing device 11 is, for example, to provide vehicle control unit 12 with values from data processing unit 14.

Data are transmitted between vehicle control unit 12 and influencing device 11. DE 102006062555 A1 discloses a method for transmitting the data of a vehicle control unit 12 to an influencing device 11, said method in which influencing device 11 contains a first execution unit 17, a memory, and an interface 16, preferably to a debug interface of vehicle control unit 12. It is possible to monitor addresses, to be monitored, in the memory of a vehicle control unit 12 with the debug interface of vehicle control unit 12, which has a so-called trace functionality, and to send the data to influencing device 11.

As FIG. 5 shows, influencing device 11 serves as a communication device between vehicle control unit 12 and data processing unit 14. In the conventional art, all data and commands are processed by influencing device 11 by means of a first execution unit 17 of influencing device 11. An execution unit 17 is, for example, an FPGA, a separate processor, or a core of a multicore processor.

SUMMARY OF THE INVENTION

It is therefore an object of the invention to provide a method that refines the conventional art.

According to an embodiment of the invention, a method is provided for processing data in an influencing device 11, whereby influencing device 11 is connected to a vehicle control unit 12 and to a data processing unit 14. Vehicle control unit 12 and influencing device 11 are disposed in a motor vehicle or, for example, on a test bench or in a laboratory. A first program runs in vehicle control unit 12. Data are exchanged according to an XCP protocol or a CCP protocol between data processing unit 14 and influencing device 11.

Influencing device 11 has a second execution unit according to the invention, whereby the second execution unit executes predetermined data processing steps more rapidly than first execution unit 17. According to the method of the invention, the data exchanged by means of the XCP protocol or the CCP protocol are checked for a predetermined criterion and, based on the result of the check, the data are processed either in first execution unit 17 or in the second execution unit.

An advantage of the invention is that the data are processed depending on the processing needs in first execution unit 17 or the second execution unit and thus data, which must be processed based on real-time conditions within a given time period, are processed in the second execution unit by means of more rapid data processing steps, as a result of which in contrast to the state of the art the data processing is better assured within the given time period. It is furthermore now possible, for example, that data that need not be calculated in real time, such as, for example, configuration commands, are processed in first execution unit 17, whereas data are processed parallel and thus in real time in the second execution unit. As a result, a high data throughput and short latencies are achieved, for example, for calibration applications, measurement applications, stimulus applications, and bypass applications.

In an embodiment of the invention, the data have a first priority or a second priority and the priority of the data is checked as a criterion. The data with a first priority should be processed, for example, within a predetermined time period and are processed, for this reason, in the second execution unit, whereas the data with a second priority, for example, need not be processed within a predetermined time period and, for this reason, are processed in first execution unit 17.

In another embodiment, the data sent from vehicle control unit 12 to influencing device 11 are checked for the predetermined criterion and, based on the result of the check, the data are processed either in first execution unit 17 or in the second execution unit.

In another embodiment, influencing device 11 has a component upstream of first execution unit 17 and the second execution unit. The data are apportioned by means of the upstream component to first execution unit 17 and to the second execution unit.

In another embodiment, the data processing is carried out in the second execution unit by means of an FPGA unit.

In another embodiment of the invention, first execution unit 17 is a processor unit that carries out a sequential program.

In another embodiment, influencing device 11 comprises a third execution unit. Further, at least three types of data are provided, whereby a first type of data is processed in first execution unit 17, a second type of data in the second execution unit, and a third type of data in the third execution unit.

In another embodiment of the invention, the second execution unit and/or the third execution unit are programmed or configured by means of first execution unit 17. This has the advantage, for example, that the flexibility of a processor is combined with the high data throughput of an FPGA.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
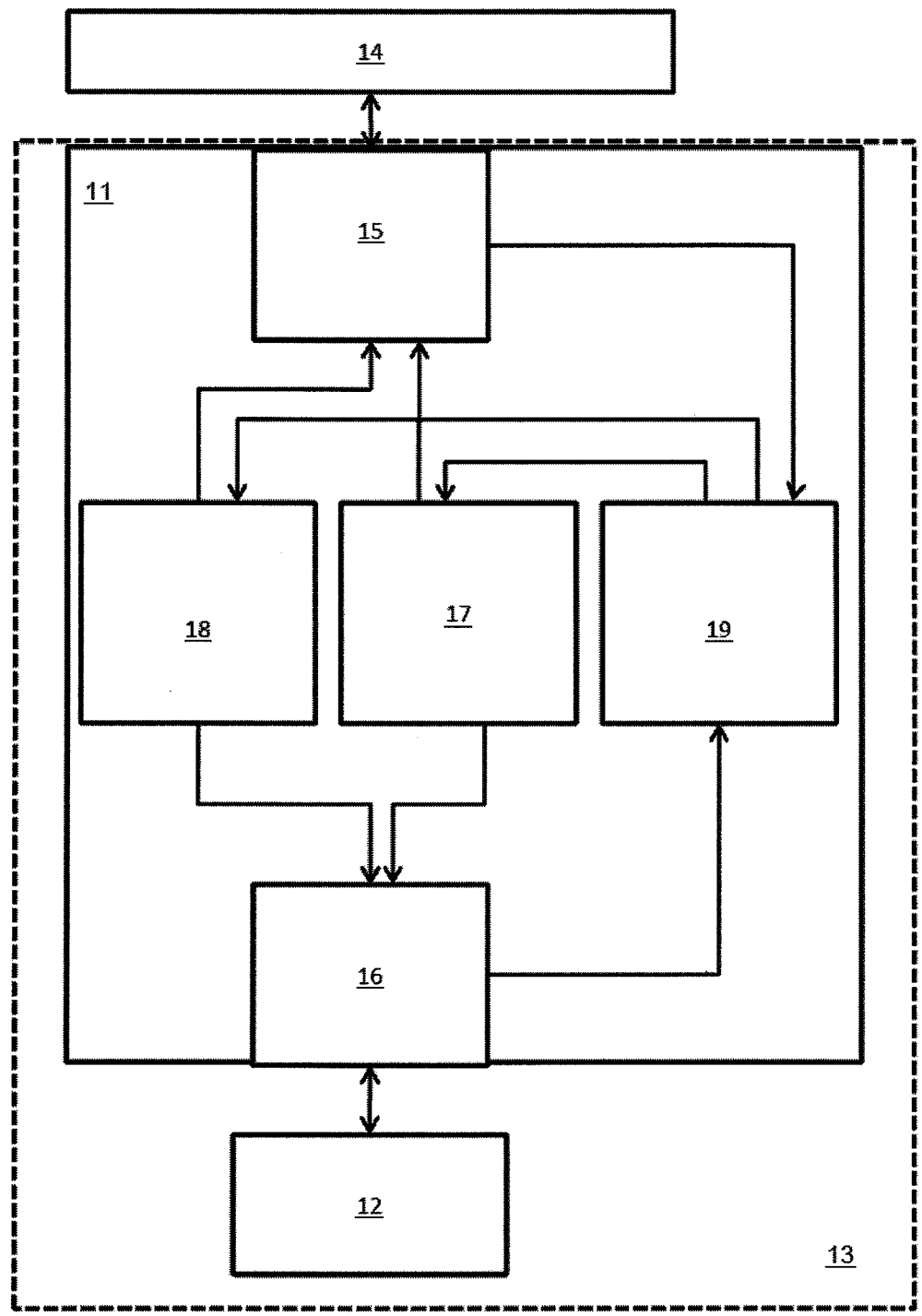
FIG. 1 shows an embodiment according to the invention of a method for processing data in an influencing device.

FIG. 1 shows an embodiment according to the invention of a method for processing data in an influencing device.

A vehicle control unit 12 is connected to an influencing device 11 via a vehicle control unit interface 16, whereby vehicle control unit 12 and influencing device 11 are disposed together in a housing 13 or in two different housings.

For example, the data are sent via a trace interface of vehicle control unit 12 to influencing device 11 or influencing device 11 reads the data, for example, via a debug interface, from a memory of vehicle control unit 12.

Influencing device 11 can furthermore sent data to vehicle control unit 12, for example, via an interface provided for this purpose or in that influencing device 11 writes the data to be sent via an interface, particularly via a debug interface of vehicle control unit 12, in the memory of vehicle control unit 12.

Influencing device 11 is connected, furthermore, to a data processing unit 14 via a data processing unit interface 15. A data processing unit 14 is, for example, a personal computer, a simulator, or a processor board. A data transmission between influencing device 11 and data processing unit 14 occurs according to the XCP protocol or the CCP protocol.

The XCP protocol (XCP) is a network protocol. It was standardized by ASAM e.V. and is used primarily in the development and testing of control devices for motor vehicles. The XCP protocol is based on experience with the CCP protocol. Because the CCP protocol is very similar to the XCP protocol, the invention likewise comprises the CCP protocol as well as the XCP protocol.

The XCP protocol generalizes the access to the control devices so that different transport layers can be used, for example, CAN, Ethernet, Flexray, and USB. It is based on message parcels by which an XCP master can communicate with an XCP slave. Data processing unit 14, for example, is an XCP master. An XCP slave is, for example, influencing device 11.

The XCP protocol differentiates three different types of commands: DAQ, STIM, and CMD.

DAQ is understood to be a measurement, which according to the definition of XCP includes the processing of address lists. Data are read based on a predetermined address list from vehicle control unit 12 and sent as a DAQ message to the master, for example, data processing unit 14. The acquisition or sending of these DAQ messages occurs based on events or triggers.

STIM has a similar function as DAQ but only the direction of the data is changed. An XCP master, for example, data processing unit 14, sends STIM data to the XCP slave, for example, influencing device 11. The XCP slave writes said data based on the present configuration in vehicle control unit 12. The writing in vehicle control unit 12 in turn is initiated by events.

Also, the XCP protocol provides commands, so-called CMD commands, by which a master forms a connection with a slave and by which the master, for example, configures the slave or exchanges information. The configuration in this case is, for example, the configuration of DAQ and STIM. When DAQ/STIM is running, other CMD messages can be exchanged. Thus, changes in non-variable parameters of a motor vehicle control unit program can therefore be carried out parallel to the runtime of a DAQ or STIM via CMD messages through the XCP master calibration processes.

Moreover, a master can regularly request information from the slave, such as status information or the time of the slave, for example, to synchronize itself to this time or to make sure that the slave is still available.

After a configuration has been established, a slave such as influencing device 11, for example, without a further request from the master such as data processing unit 14 can run a DAQ, therefore measurement of data, and provide data processing unit 14, for example, with measured data from vehicle control unit 12. Said measured data can be, for example, memory area data of vehicle control unit 12, which are collected by the influencing device in a self-sustaining manner within a specific time pattern or based on established events from vehicle control unit 12 and are sent to data processing unit 14, the master.

The master itself can send independently, for example, simultaneously thereto, STIM data or other configuration/status messages, therefore CMD messages, to influencing device 11.

STIM data are received by data processing unit 14 from processing device 11, and with the aid of the previously established configuration based on specific events, such as, e.g., within a specific time pattern, a detection of a motor vehicle control unit event such as, for example, a variable is being written or was written in a vehicle control unit 11 immediately after the data were received.

The configuration indicating which circumstances trigger a specific event, which in turn carry out a DAQ and/or a STIM according to the configuration, is implementation-specific. Influencing device 11 offers, for example, configuration options for this. The assignment of the DAQ data and STIM data to the specific events is, in contrast, part of the XCP protocol.

Configuration or status messages, for example, an alive check or time synchronization messages, in contrast, are used as a rule only internally by influencing device 11.

DAQ and STIM data transmissions are usually time critical and should have a low latency and high bandwidth, so that, for example, bypass applications can be carried out performantly.

Configuration tasks or status information such as the CMD data, in contrast, are usually not time-critical and can even be delayed in favor of DAQ and STIM processing.

Influencing device 11 has a second execution unit according to the invention, whereby the second execution unit executes predetermined data processing steps more rapidly than first execution unit 17. For example, the time-critical parts of the XCP protocol processing are realized in rapid parallelized hardware, optimized for the application, whereas parts of the XCP protocol that are not time-critical, for example, XCP configuration commands are processed in sequentially executed software in first execution unit 17.

Influencing device 11 receives data either from vehicle control unit 12 or from data processing unit 14. It is decided in influencing device 11 according to the invention which data are processed by first execution unit 17 and which data are processed by second execution unit 18.

Figure 2:
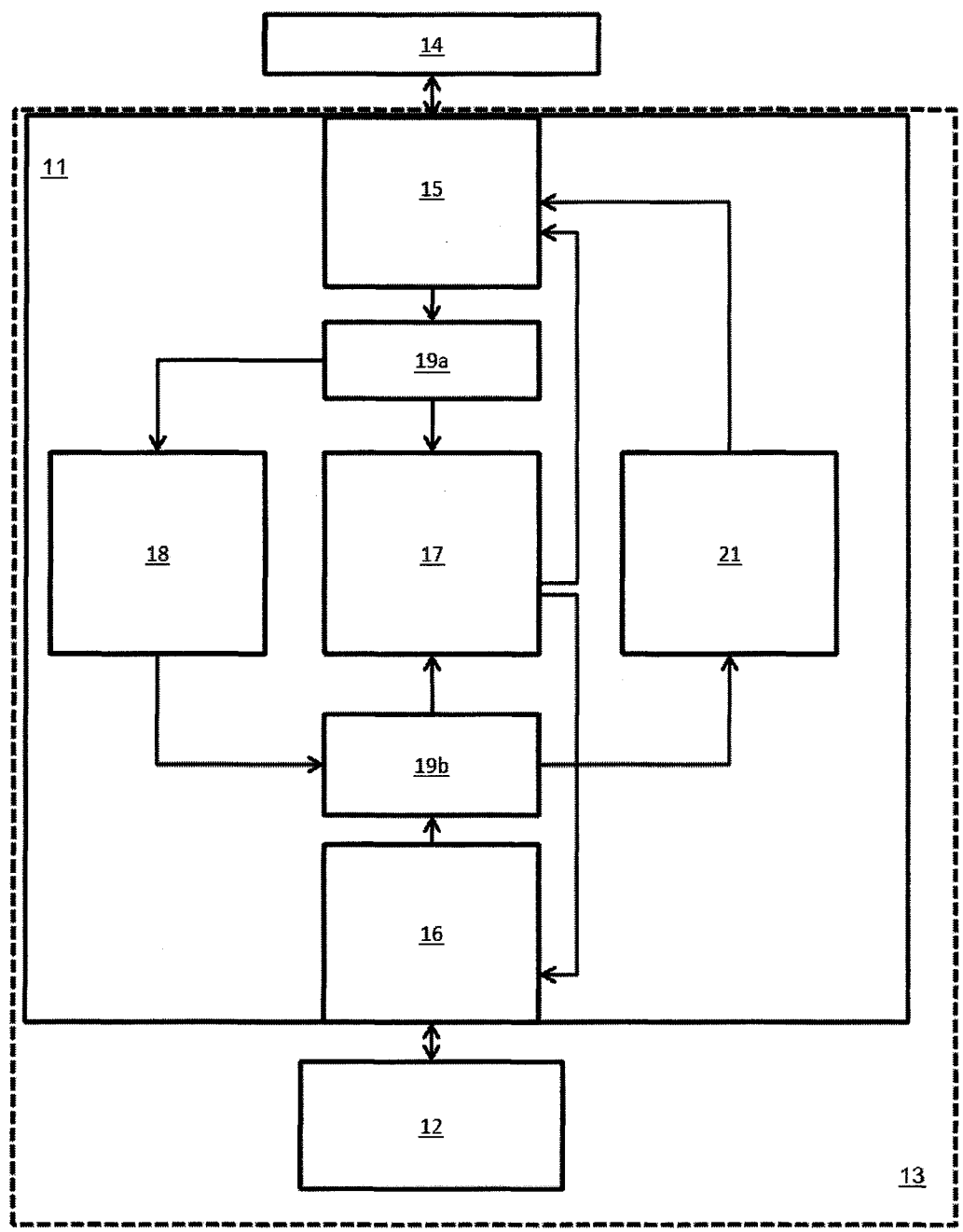
FIG. 2 shows another embodiment according to the invention of a method for processing data in an influencing device.
Figure 3:
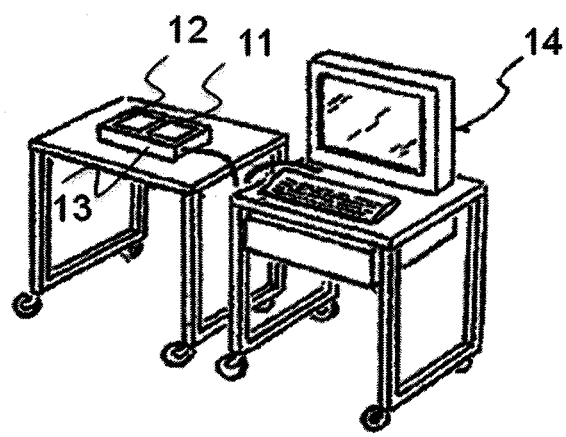
FIG. 3 shows a schematic view of the arrangement of a vehicle control unit 12 and an influencing device 11 in a laboratory according to the conventional art.
Figure 4:
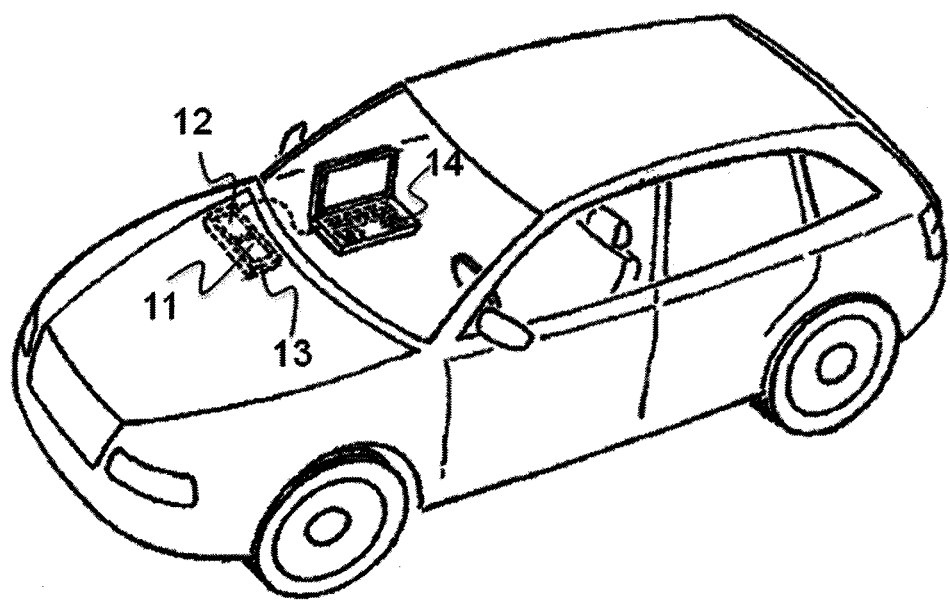
FIG. 4 shows a schematic view of the arrangement of a vehicle control unit 12 and an influencing device 11 in a motor vehicle according to the conventional art.
Figure 5:
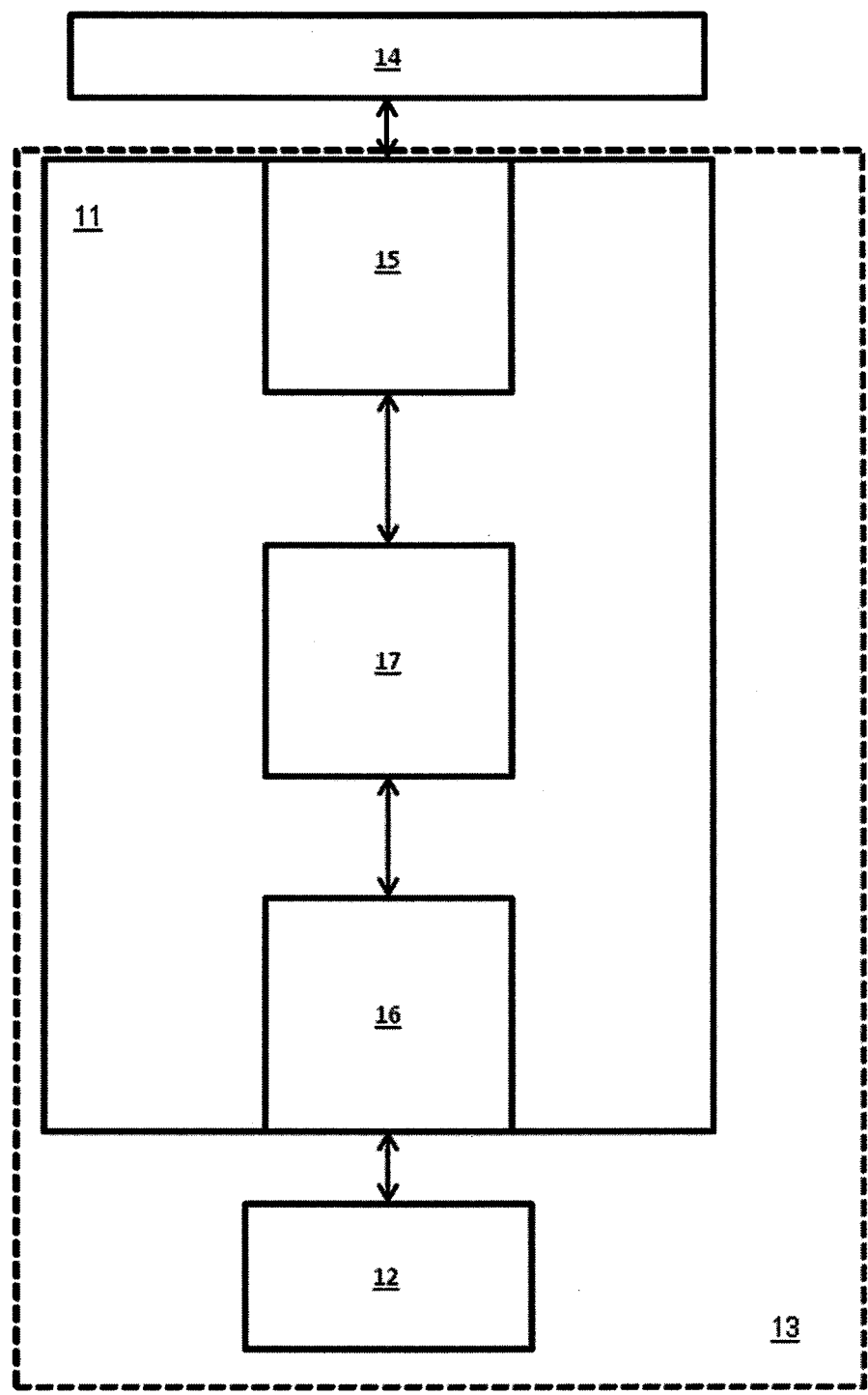
FIG. 5 shows a schematic view of the structural design of a vehicle control unit 12 and an influencing device 11 according to the conventional art.

In a preferred embodiment, there is a component 19 upstream of first execution unit 17 and second execution unit 18. The upstream component is either a component 19 for both execution units, as shown in FIG. 1, or an upstream component 19a each for the data sent via the data processing unit interface to the influencing device, and an upstream component 19b for the data sent via the control unit interface, as shown in FIG. 2. The upstream component 19a for the data sent via the data processing unit interface to the influencing device is formed as a separate component or as associated with the data processing unit interface. Likewise, the upstream component 19b for the data sent via the control unit interface to the influencing device is formed as a separate component or as associated with the data processing unit interface. It is decided in the upstream component 19 according to the invention whether the data are processed in influencing device 11 in first execution unit 17 or in second execution unit 18.

In another embodiment, which is not shown, it is decided in first execution unit 17 whether the data are processed in influencing device 11 in first execution unit 17 or in second execution unit 18.

In another embodiment, which is not shown, it is decided in second execution unit 18 whether the data are processed in influencing device 11 in first execution unit 17 or in second execution unit 18.

In another embodiment, which is not shown, it is decided in regard to the data sent from vehicle control unit 12 to influencing device 11 in motor vehicle control unit interface 16 whether the data are processed in first execution unit 17 or in second execution unit 18.

Another embodiment is illustrated in FIG. 2. In this embodiment, influencing device 11 has a third execution unit 21 in addition to first execution unit 17 and second execution unit 18. For example, third execution unit 21, like second execution unit 18, carries out predetermined data processing steps more rapidly than first execution unit 17, whereby the predetermined data processing steps are the same that second execution unit 18 also carries out more rapidly than first execution unit 17 or other predetermined data processing steps. The data are processed in first execution unit 17, second execution unit 18, or third execution unit 21. The apportioning of the data to first execution unit 17, second execution unit 18, or third execution unit 21 occurs either via the mutual upstream component 19 or via one of the separate upstream components 19a or 19b.

In a preferred embodiment, at least three types of data are provided, whereby the three types of data are, for example, DAQ, STIM, and CMD data.

The data processing occurs depending on the type of the data in first execution unit 17, second execution unit 18, or third execution unit 21. For example, CMD data are processed in first execution unit 17. These data need not be processed in real time and therefore do not need any especially rapid processing steps. The second type and third type of data, such as, for example, DAQ and STIM data, in contrast, need to be processed within a predetermined time interval. For example, to be able to process the data of the second type and the data of the third type in a parallel manner, the STIM data are processed in second execution unit 18 and the DAQ data in third execution unit 21.

In another embodiment of the invention, which is not shown, the second execution unit and/or the third execution unit are programmed and/or configured by means of first execution unit 17. The first execution unit accepts the desired configuration during runtime and programs and/or configures the second execution unit and/or the third execution unit also during the runtime. This has the advantage, for example, that the flexibility of a processor is combined with the high data throughput of an FPGA.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for processing data, the method comprising:
providing a vehicle control unit, an influencing device connectable to the vehicle control unit, and a data processing unit connectable to the influencing device, the influencing device having a first execution unit, the vehicle control unit and the influencing device being arranged in a motor vehicle or the vehicle control unit and the influencing device being arranged on a test bench or laboratory bench;
running a first program in the vehicle control unit;
exchanging data according to an XCP protocol and/or a CCP protocol between the data processing unit and the influencing device, wherein the data have a first priority or a second priority;
providing a second execution unit in the influencing device;
executing, via the second execution unit, predetermined data processing steps more rapidly than the first execution unit;
checking the priority of the data exchanged via the XCP protocol or the CCP protocol; and
apportioning the data with the first execution unit or in with the first priority to the second execution unit and apportioning the data with the second priority priority to the first execution unit, wherein the apportioning the data to the first execution unit and the second execution unit is carried out via the first execution unit, the second execution unit, the data processing unit interface, the motor vehicle control unit interface, or a component of the influencing device upstream of the first execution unit and the second execution unit.

2. The method according to claim 1, wherein, based on the result of the check, the data are processed either in the first execution unit or in the second execution unit.

3. The method according to claim 1, wherein the data processing is carried out in the second execution unit by an FPGA (field-programmable gate array) unit.

4. The method according to claim 1, wherein the first execution unit is a processor unit that carries out a sequential program.

5. The method according to claim 1, wherein the influencing device comprises a third execution unit, wherein at least three types of data are provided, and wherein a first type of data is processed in the first execution unit, a second type of data in the second execution unit, and a third type of data in the third execution unit.

6. The method according to claim 1, wherein the second execution unit and/or the third execution unit are reprogrammed or configured via the first execution unit.

7. An influencing device for processing data between a vehicle control unit running a first program and a data processing unit, the influencing device comprising:
- first and second execution units, the second execution unit being configured to execute predetermined data processing steps more rapidly than the first execution unit;
- an interface configured to exchange data with the data processing unit according to an XCP protocol and/or a CCP protocol; and
- a hardware component configured to check the data exchanged via the XCP protocol or the CCP protocol for a first priority or a second priority, and to apportion the data, based on a result of the check, for processing either in the first execution unit in accordance with the second priority or in the second execution unit in accordance with the first priority,
- wherein the hardware component configured to apportion the data to the first execution unit or the second execution unit corresponds to the first execution unit, the second execution unit, the interface, the vehicle control unit, or a component of the influencing device upstream of the first execution unit and the second execution unit.

* * * * *